US005706693A

United States Patent [19]
Chubb et al.

[11] Patent Number: 5,706,693
[45] Date of Patent: *Jan. 13, 1998

[54] COMBINED SHEET BENDING BRAKE AND CUTTER

[75] Inventors: Arthur B. Chubb, Romulus; Douglas J. Chubb; Norman L. Chubb, both of Carleton, all of Mich.

[73] Assignee: Tapco International Corporation, Plymouth, Mich.

[*] Notice: The term of this patent shall not extend beyond the expiration date of Pat. No. 5,582,053.

[21] Appl. No.: 714,215

[22] Filed: Sep. 16, 1996

Related U.S. Application Data

[63] Continuation-in-part of Ser. No. 373,080, Jan. 17, 1995, Pat. No. 5,582,053, which is a continuation-in-part of Ser. No. 310,672, Sep. 22, 1994, abandoned.

[51] Int. Cl.$^6$ ..................................................... B21D 5/04
[52] U.S. Cl. .................................. 72/294; 72/319; 83/485
[58] Field of Search .......................... 72/294, 319; 83/614, 83/485, 500

[56] References Cited

U.S. PATENT DOCUMENTS

| | | |
|---|---|---|
| 516,026 | 3/1894 | Seaver . |
| 985,446 | 2/1911 | Pease . |
| 1,147,458 | 7/1915 | Steely . |
| 1,154,924 | 9/1915 | Holub . |
| 1,410,972 | 3/1922 | Wagner ........................ 83/614 |
| 1,508,869 | 9/1924 | Astrup . |
| 1,609,619 | 12/1926 | Galvin . |
| 2,109,889 | 3/1938 | Morin ........................ 83/485 |
| 2,134,536 | 10/1938 | Schmid . |
| 3,120,915 | 2/1964 | Horn ........................ 72/294 |
| 3,136,191 | 6/1964 | Madge . |
| 3,161,223 | 12/1964 | Marsh . |
| 3,447,409 | 6/1969 | Lewis ........................ 83/614 |
| 3,481,174 | 12/1969 | Barnack . |
| 3,482,427 | 12/1969 | Barnack . |
| 3,559,444 | 2/1971 | Blazey . |
| 3,675,458 | 7/1972 | Veltjens ........................ 72/294 |
| 3,817,075 | 6/1974 | Marsh ........................ 72/319 |
| 3,872,755 | 3/1975 | Marsh ........................ 83/471.3 |
| 4,131,046 | 12/1978 | Strohmeyer ........................ 83/485 |
| 4,275,500 | 6/1981 | Speer ........................ 30/40 |
| 4,321,817 | 3/1982 | Barnack ........................ 72/319 |
| 4,557,132 | 12/1985 | Break ........................ 72/319 |

(List continued on next page.)

FOREIGN PATENT DOCUMENTS

| | | | |
|---|---|---|---|
| 567377 | 12/1958 | Canada ........................ 83/485 |
| 2504429 | 10/1982 | France ........................ 72/294 |
| 667492 | 11/1938 | Germany ........................ 83/485 |
| 2223035 | 2/1973 | Germany ........................ 72/294 |
| 629304 | 12/1961 | Italy ........................ 83/500 |
| 934951 | 8/1963 | United Kingdom ........................ 83/485 |

OTHER PUBLICATIONS

Tapco Roller Cutter—Form No. 1700–102 Apr. 1988.
Knoll–Profilierkopf—Knoll, 1993.
Dimos Coupe–Feuille Rotalame.
Nesta Couverture Outil de Coupe.

Primary Examiner—Daniel C. Crane
Attorney, Agent, or Firm—Barnes, Kisselle, Raisch, Choate, Whittemore & Hulbert, P.C.

[57] ABSTRACT

A portable sheet bending brake comprising a base and a plurality of C-shaped members positioned on the base. Each C-shaped member comprises a lower arm fixed to the base and an upper arm spaced from and overlying the lower arm. A first member is fixed to the lower arms of the C-shaped members and has a longitudinally extending clamping surface. A second member for bending a workpiece is hinged to the first member and extends longitudinally with respect to the first member. A longitudinally extending clamping member is pivoted to the upper arm of the C-shaped members. A handle member is provided on the brake for moving the clamping member. A cutter rotatably supports opposed cutting rolls and includes first rollers engaging the clamping member and second rollers engaging the bending member.

18 Claims, 3 Drawing Sheets

U.S. PATENT DOCUMENTS

| | | | |
|---|---|---|---|
| 4,574,480 | 3/1986 | Dunn | 30/240 |
| 4,646,420 | 3/1987 | Ebrahimian | 72/324 |
| 4,693,004 | 9/1987 | Plana | 30/265 |
| 4,738,018 | 4/1988 | Ebrahimian | 72/324 |
| 5,007,318 | 4/1991 | Cox | 83/422 |
| 5,042,349 | 8/1991 | Komatsu . | |
| 5,404,739 | 4/1995 | George, II | 72/294 |

COMBINED SHEET BENDING BRAKE AND CUTTER

This application is a continuation-in-part of U.S. application Ser. No. 08/373,080, filed Jan. 17, 1995, now U.S. Pat. No. 5,582,053, which is a continuation-in-part of application Ser. No. 08/310,672 filed Sep. 22, 1994, now abandoned.

This invention relates to sheet bending brakes.

BACKGROUND AND SUMMARY OF THE INVENTION

In recent years, various structures have been provided to form a portable sheet bending brake for bending metal or plastic sheets such as are used in siding on homes and buildings. Typical patents comprise U.S. Pat. Nos. 3,161,223, 3,481,174, 3,482,427, 3,559,444, 3,817,075, 3,872,755 and 4,321,817.

Such brakes comprise a fixed member on which the sheet is clamped and a movable bending member for bending the sheet. A major problem with respect to such sheet bending brakes is the tendency of the bending member to move relative to the portion of the sheet being bent and thereby mar the surface of the sheet.

In U.S. Pat. No. 3,161,223, the tendency to mar the surface of the sheet material was minimized by having the intermeshing integral projections between the fixed member and bending member which extend longitudinally and define the hinge that connects the bending member with the fixed member having the clamping surface, positioned so that all portions of the projections do not extend above the plane of the surface of the members when the surfaces are substantially aligned.

U.S. Pat. Nos. 3,481,174 and 3,482,427 were directed to an arrangement which included a floatable compensator on the bending member which engages the sheet material and as the bending member is swung to bend the sheet pivots so that the contact with the sheet material is maintained.

In U.S. Pat. No. 4,557,132 there is disclosed and claimed a sheet bending brake that incorporates a novel construction for minimizing the marring of the surface of the sheet material during bending; which functions without the need for added parts; which can be manufactured at low cost; and which can be adapted to sheet material of various thickness; and which can be utilized in a novel fashion to provide a complete 180° bend to the sheet material.

As described in the aforesaid patent, each of the fixed and movable bending members have substantially the entire length of the longitudinal edges thereof formed with longitudinally spaced intermeshing integral projections. The projections on the bending member having a plurality of aligned openings and the projections on the fixed member have a plurality of aligned openings comprising slots extending axially with respect to the longitudinal axis of said member. A hinge pin extends through the openings of said bending member and the slots of the fixed member. The slots have a configuration such that as the bending member is moved relative to the fixed member to bend a workpiece, the hinge pin is guided along said slots such that the contacting portion of the bending member remains substantially in the same position relative to the workpiece.

In the use of such portable sheet metal bending brakes, it is sometimes necessary to cut a workpiece while the workpiece is clamped in the sheet metal bending brakes. It is common to use a utility knife to score the workpiece and then bend the work piece back and forth along the score line. Such a method results in edges that are not accurate, not smooth and not flat. This manner of cutting leaves a rolled edge. In addition, it is time consuming. Furthermore, there is serious risk of marring the aluminum parts of the brake which include the clamping surface, clamping member, bending member and hinge. As a result, the repeated use of the utility knife eventually cuts the edges of the clamping member and may eventually severely damages and cut through the hinge. This reduces the useful life of the portable sheet bending brake.

In the aforementioned U.S. Pat. No. 5,582,053 a portable bending brake and hand operated cutter system is provided that is removably mounted on a portable sheet bending brake; which will accurately cut the workpiece; which requires no modification of the portable sheet bending brake; which can be readily used to an existing portable sheet bending brake; which wall provide accurate, smooth and flat edges on the workpiece; which cuts the workpiece quickly and is therefore time saving; which does not damage the aluminum parts of the portable sheet bending brake; and which is low in cost. The invention, the portable sheet bending brake includes a track mounted on either the clamping member, the bending member or the clamping handle and a removable cutter having cutting rolls thereon engaging said track and manually movable longitudinally of the track to cut a workpiece clamped in the portable sheet bending brake. In one form, the track is on the clamping member of the portable sheet bending brake and the rollers on the cutter engage the track. A second set of rollers of the cutter engage another portion of the clamping member so that the cutter is mounted in cantilever fashion on the clamping member. In another form, the track is on the C-shaped members that support the clamping members and are constructed and arranged to mount the cutter in cantilever fashion. In another form, the track on the clamping member is removably mounted on the clamping member. In a further form, the track is mounted on the bending member. In another form, the track is hinged to the bending brake.

Among the objectives of the present invention are to provide a portable bending brake and hand operated cutter system which does not require a track; which will accurately cut the workpiece; which requires no modification of the portable sheet bending brake; which can be readily used to an existing portable sheet bending brake; which wall provide accurate, smooth and flat edges on the workpiece; which cuts the workpiece quickly and is therefore time saving; which does not damage the aluminum parts of the portable sheet bending brake; and which is low in cost. The invention, the portable sheet bending brake includes a track mounted on either the clamping member, the bending member or the clamping handle and a removable cutter having cutting rolls thereon engaging said track and manually movable longitudinally of the track to cut a workpiece clamped in the portable sheet bending brake.

In accordance with the invention, the hand held cutter is provided with spaced anti-friction means that engage separately spaced surfaces of the portable sheet bending brake. More specifically, a first anti-friction means engages the clamping member and a second anti-friction means engages the bending member to guide the hand held cutter without the need for a track.

3

Figure 3:
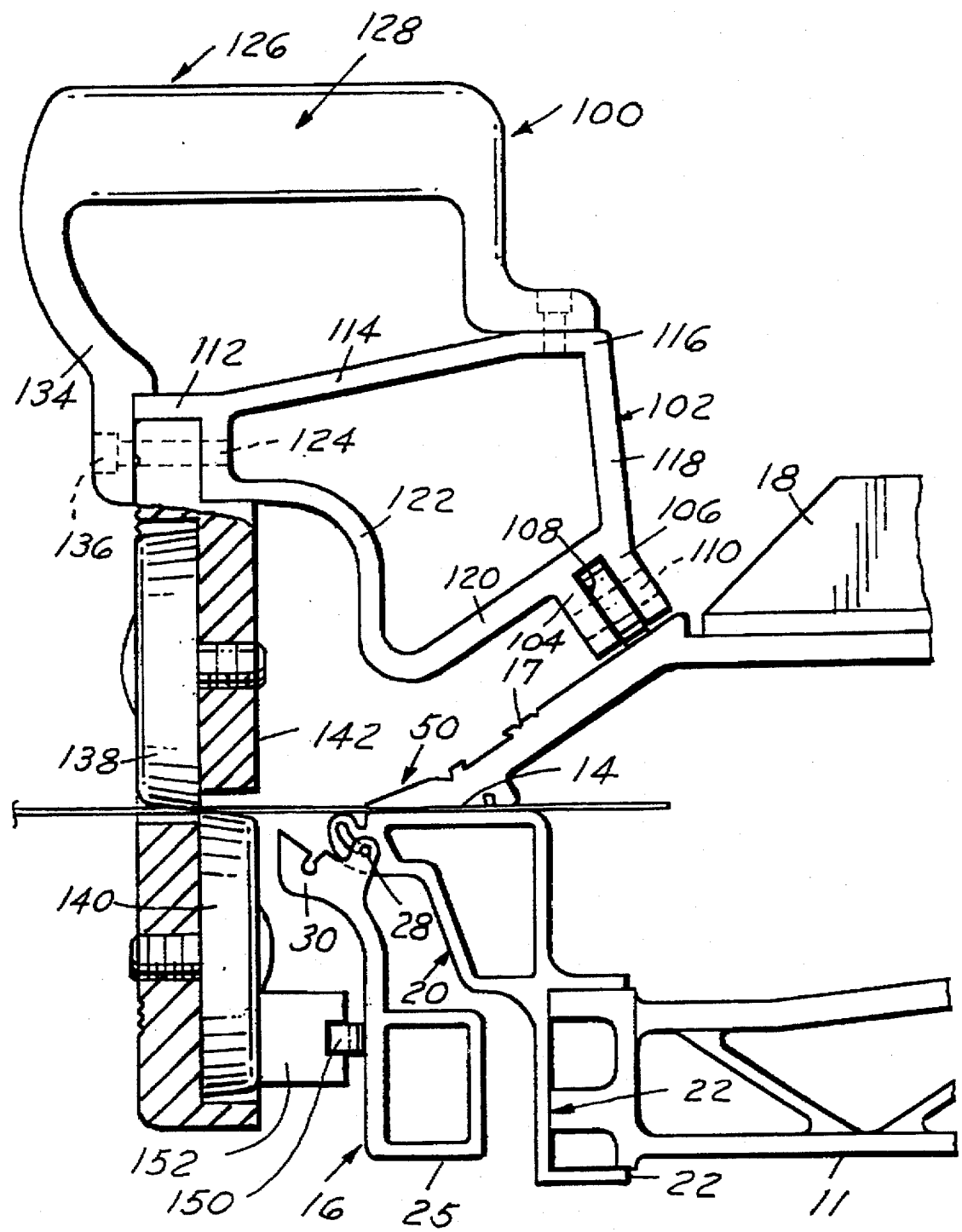

FIG. 3 is a side elevational view on an enlarged scale of a portion of the sheet bending brake and removable cutter embodying the invention.

DESCRIPTION OF THE PREFERRED EMBODIMENTS

Figure 1:
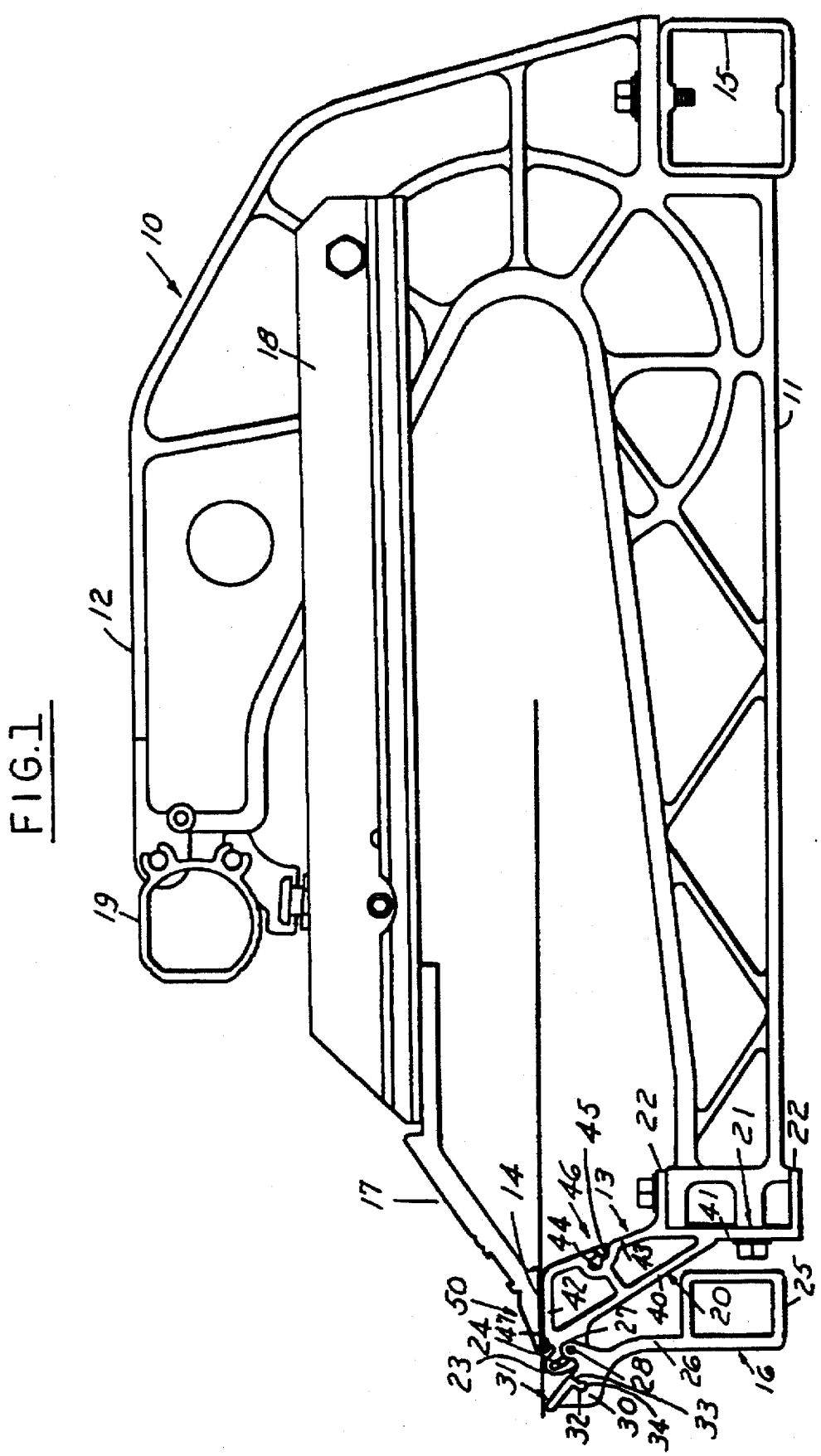
FIG. 1 is a side elevational view of one type of sheet bending brake which may be used in the invention.

Referring to FIG. 1, the sheet bending brake to which the invention can be applied comprises longitudinally spaced C-shaped frame members 10. Each frame member 10 includes a lower arm 11 and an upper arm 12 which overlies the lower arm 11 in spaced relation thereto. Legs may be provided as needed to support the brake above the floor or working area.

A first extruded fixed member 13 is fixed on the ends of the free lower arms 11 and defines a clamping surface 14. Longitudinally spaced base rails 15 are fixed to the rear end of the lower arms 11. A second extruded bending member 16 is hinged to the first member 13, as presently described, to provide a means for bending the sheet material.

Clamping member 17 extends longitudinally in overlying relationship to the clamping surface 14 of the first member 13. Means are provided for moving the anvil member toward and away from the clamping surface to clamp a workpiece on the clamping surface. The means for clamping the workpiece may comprise any of the structures set forth in the aforementioned United States Patents, incorporated herein by reference, but as herein shown comprise channel shaped pivot bars 18 pivoted on each frame member 10 with the clamping member 17 fixed thereto and handle member 19 pivoted to the upper arm 12 of each C-frame member 10 and to pivot bars 18 by a plurality of extensible links 19 pivoted at the upper edge to the handle member 19 and at the lower end to the pivot bars 18. The extensible links may be of the type shown in U.S. Pat. No. 4,557,132, incorporated herein by reference, or U.S. Pat. No. 5,353,620 incorporated herein by reference. The first member 13 having the clamping surface 14 is formed as an aluminum extrusion and includes an upper tubular portion 20 and a lower portion 21 including spaced flanges 22 engaging the free ends of lower arms 11. A plurality of longitudinally spaced projections 23 are provided at the juncture of the portion 20 which defines the clamping surface 4. Each projection 23 has a slot 24 formed therein and the slots 24 of the various projections 23 are in longitudinal alignment. Each slot 24 has its lower ends spaced from the clamping surface A and extends outwardly and upwardly so that its upper end is generally near the plane of the clamping surface. Each slot 24 is preferably arcuate and has a center spaced from the clamping surface and preferably extends for substantially 90°.

The bending member 16 is also in the form of an aluminum extrusion including a tubular portion 25 and a longitudinally extending leg 26 with a plurality of longitudinally spaced projections 27 having openings 28 therein. The projections 27 of the bending member 16 mesh with the projections 23 of the fixed member 13 and a pin 29 extends through the openings 28 and slots 24 to hinge the bending member 16 to the fixed member 13. The bending member 16 further includes a portion 30 that extends upwardly and outwardly when the bending member 16 is in position for bending and has a contacting portion defined by a longitudinally extending plastic strip 31 positioned in a recess 32. The recess is generally L-shaped and the strip 31 includes a short leg 33 having an enlarged end portion 34 for holding the strip 31 and the other leg 35 thereof extends along the recess beyond the portion to define a sheet contacting portion. Strip is preferably made of polyurethane having a durometer of 60 on the A scale.

4

The fixed member 13 further includes a recess 36 extending longitudinally at the juncture of the clamping surface 14 and the projections 23. Recess 36 functions as a pocket into which any burrs may fall from a knife used for scoring the workpiece. The clamping surface 14 is spaced slightly above the projections 23 in order to minimize marring of the surface of the workpiece when it is inserted and removed. The bending member 16 also includes a recess 37 extending longitudinally between the projections 27 and the contacting portion 31.

In use, a workpiece of sheet material is clamped against the clamping surface 14 and the bending member 16 is moved by swinging the handle bringing the contacting portion of the bending member 16 in engagement with the sheet material. As the bending member is swung upwardly, the hinge pin 29 on the bending member 16 moves along the slots 24 and is guided in a fashion such that the contacting portion maintains substantially the same relative position of contact thereby minimizing marring of the surface of sheet material.

A hand operated cutter 100 comprises an extruded generally tubular body 102 which includes integral space walls 104, 106 that extends downwardly and inwardly. A pair of longitudinally spaced bearing supported rollers 108 are rotatably supported between walls 104, 106 by pins 110 pressed in place is aligned openings in walls 104. Body 102 includes an outer integral flange 112 which overlies the upper edge of a roller cutter body 122 and is fastened thereto by screws 124.

The cross section of tubular body 102 preferably includes a top wall having a first portion 114 extending from outer flange 112 upwardly and inwardly, a short second horizontal portion 116 extending from portion 114, a third portion 118 extending from second portion 128 downwardly to inner flange 106. The body 102 includes a lower flange 120 that extends downwardly and inwardly from inner flange 104 to an outer inwardly concave portion 122 extends from wall 138 to a short vertical wall 124 that is connected to the juncture of portion 114 and outer flange 112.

A one piece handle 126 is provided and includes a horizontal portion 128 having one smooth side surface 130 and an opposite surface 132 providing a finger receiving recess. The handle 126 further includes an inner downwardly and inwardly extending flange 134 that engages to portion 112 of body 102 by bolt on 130. Handle 144 includes an outer flange which extends along cutter body 122 and is connected thereto by a bolt 160 extending through body 122 and threaded into vertical wall 124.

The cutter includes an upper and outer cutting roller 138 and a cooperating lower and inner cutting roller 140 provided in machined recesses respectively in a cutter body 142. Each of the cutting rollers 138, 140 is identical in construction and is rotatably mounted in body 142 in the same manner. Each roller 162, 164 has cooperating cutting edges 170 which are tapered inwardly. A roller bearing extends into a cylindrical recess in its respective roller and its outer race engages an inwardly extending integral flange on the roller. A spacer is interposed between the cutter body 122 and roller and abuts the inner race of bearing. A bolt extends through the center of bearing and roller and is threaded into body 122 as shown in the aforementioned application Ser. No. 08/373,080 incorporated by reference.

Figure 2:
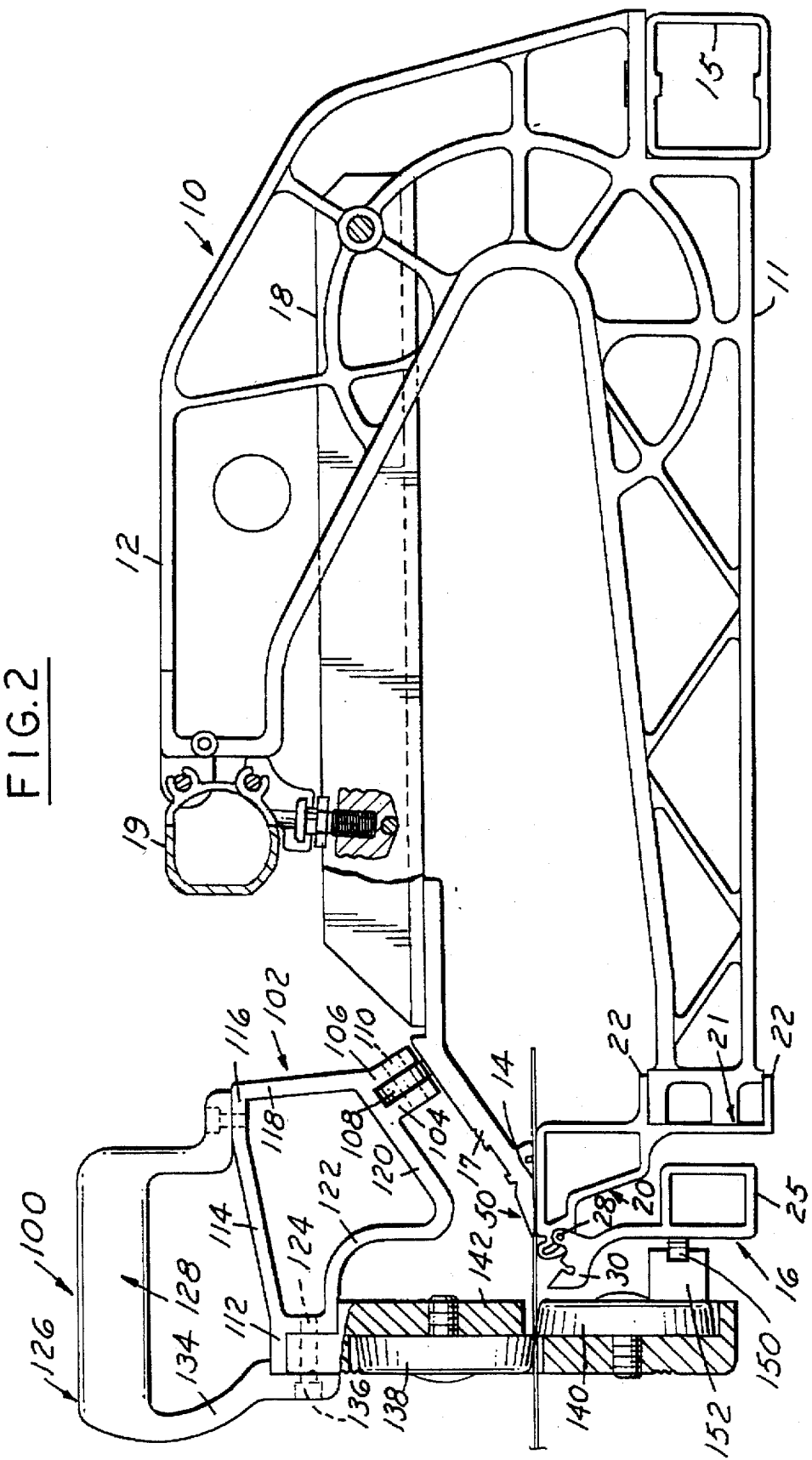
FIG. 2 is a side end elevational view of another type of sheet bending brake embodying the invention.

Referring to FIGS. 2 and 3, the cutter includes a second roller 150 rotatably mounted on a spacer 152 on cutter body 142 for rotation about a vertical axis and engages the surface bending member 16 which extends vertically when the bending member is not being used.

It can thus be seen that there has been provided a portable bending brake and hand operated cutter system that is removable mounted on a portable sheet bending brake; which will accurately cut the workpiece; which requires no modification of the portable sheet bending brake; which can be readily used to an existing portable sheet bending brake; which will provide accurate, smooth and flat edges on the workpiece; which cuts the workpiece quickly and is therefore time saving; which does not damage the aluminum parts of the portable sheet bending brake; and which is low in cost.

What is claimed is:

1. A portable sheet bending brake comprising a base, a plurality of C-shaped members positioned on said base at longitudinally spaced points, each said C-shaped member comprising a lower arm fixed to said base and an upper arm spaced from and overlying said lower arm, a first member fixed to the lower arms of said C-shaped members and having a longitudinally extending clamping surface, a second member for bending a workpiece hinged to said first member and extending longitudinally with respect to said first member, each of said first and second members having substantially the entire length of the longitudinal edges thereof formed with longitudinally spaced intermeshing integral projections, a hinge pin extending through said openings of said second member and said slots of said first member, a longitudinally extending clamping member mounted on the upper arm of said C-shaped members, a handle member on said brake for moving said clamping member, a removable cutter, said cutter comprising a cutter body rotatably supporting opposed cutting rolls adjacent the clamping surface when the cutter is mounted on said sheet bending brake, said cutter comprising first anti-friction means engaging said clamping member when said cutter is mounted on said portable sheet bending brake, said cutter body comprising second anti-friction means engaging said bending member when said cutter is mounted on said portable sheet bending brake.

2. The portable sheet bending brake set forth in claim 1 wherein said cutter comprises a second body supporting said cutter body and said first anti-friction mean.

3. The portable sheet bending brake set forth in claim 2 including handle means on said second body.

4. The portable sheet bending brake set forth in claim 3 wherein said second body comprises an extruded hollow body.

5. The portable sheet bending brake set forth in claim 3 wherein said tubular body comprises integral spaced flanges, said anti-friction means comprising at least one roller rotatably mounted between said flanges.

6. The portable sheet bending member set forth in claim 5 wherein said tubular body includes an integral flange overlying said roller engaging said track.

7. The portable sheet bending member set forth in claim 6 wherein said tubular body includes an integral flange overlying said cutter body.

8. The portable sheet bending brake set forth in claim 7 including a U-shaped handle attached to said cutter body and tubular body.

9. The portable sheet bending brake set forth in claim 8 wherein said handle member includes a gripping portion with a smooth surface and an opposite surface having finger receiving grooves therein.

10. For use on a portable sheet bending brake of the type having a base, a plurality of C-shaped members positioned on said base at longitudinally spaced points, each said C-shaped member comprising a lower arm fixed to said base and an upper arm spaced from and overlying said lower arm, a first member fixed to the lower arms of said C-shaped members and having a longitudinally extending clamping surface, a second member for bending a workpiece hinged to said first member and extending longitudinally with respect to said first member, each of said first and second members having substantially the entire length of the longitudinal edges thereof formed with longitudinally spaced intermeshing integral projections, a hinge pin extending through said openings of said second member and said slots of said first member, a longitudinally extending clamping member mounted on the upper arm of said C-shaped members, a handle member on said brake for moving said clamping member, a removable cutter, said cutter comprising a cutter body rotatably supporting opposed cutting rolls adjacent the clamping surface when the cutter is mounted on said sheet bending brake, said cutter comprising first anti-friction means engaging said clamping member when said cutter is mounted on said portable sheet bending brake, said cutter body comprising second anti-friction means engaging said bending member when said cutter is mounted on said portable sheet bending brake.

11. The removable cutter set forth in claim 10 wherein said cutter comprises a second body supporting said cutter body and said first anti-friction mean.

12. The removable cutter set forth in claim 11 including handle means on said second body.

13. The removable cutter set forth in claim 12 wherein said second body comprises an extruded hollow body.

14. The removable cutter set forth in claim 13 wherein said tubular body comprises integral spaced flanges, said anti-friction means comprising at least one roller rotatably mounted between said flanges.

15. The removable cutter set forth in claim 14 wherein said tubular body includes an integral flange overlying said roller engaging said track.

16. The removable cutter set forth in claim 15 wherein said tubular body includes an integral flange overlying said cutter body.

17. The removable cutter set forth in claim 16 including a U-shaped handle attached to said cutter body and tubular body.

18. The removable cutter set forth in claim 17 wherein said handle member includes a gripping portion with a smooth surface and an opposite surface having finger receiving grooves therein.

* * * * *